United States Patent
Pereira et al.

(10) Patent No.: US 9,442,642 B2
(45) Date of Patent: Sep. 13, 2016

(54) TETHERED SELECTION HANDLE

(71) Applicant: Microsoft Corporation, Redmond, WA (US)

(72) Inventors: Alex Pereira, Seattle, WA (US); Jon Clapper, Redmond, WA (US); Jan-Kristian Markiewicz, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 185 days.

(21) Appl. No.: 13/918,006

(22) Filed: Jun. 14, 2013

(65) Prior Publication Data

US 2014/0372934 A1   Dec. 18, 2014

(51) Int. Cl.
  *G06F 3/0484* (2013.01)
  *G06F 3/0482* (2013.01)
  *G06F 17/24* (2006.01)

(52) U.S. Cl.
  CPC ......... *G06F 3/04842* (2013.01); *G06F 3/0482* (2013.01); *G06F 17/24* (2013.01)

(58) Field of Classification Search
  CPC ... G06F 17/24; G06F 3/0482; G06F 3/04842
  USPC ......... 345/173–179; 715/256, 272, 769, 770, 715/781, 860; 178/18.01–18.09
  See application file for complete search history.

(56) References Cited

U.S. PATENT DOCUMENTS 7,877,685 B2   1/2011  Peters
8,952,912 B1*  2/2015  Hock ........................... 345/173
2008/0259040 A1* 10/2008  Ording ................ G06F 3/04886
                                                                345/173
2009/0292989 A1  11/2009  Matthews et al.
2010/0235726 A1   9/2010  Ording et al.

(Continued)

FOREIGN PATENT DOCUMENTS

EP   2098947 A2   9/2009
EP   2469398 A2   6/2012
WO   2009019546 A2   2/2009

OTHER PUBLICATIONS

Overa, Adam, "Gestures, Text Selection, and Copy/Paste", Retrieved at <<http://www.tomshardware.com/reviews/windows-8-review,3334-10.html>>, Oct. 30, 2012, pp. 7.

(Continued)

*Primary Examiner* — Amare Mengistu
*Assistant Examiner* — Stacy Khoo
(74) *Attorney, Agent, or Firm* — George Ngengwe; Jim Ross; Micky Minhas

(57) ABSTRACT

Technologies are generally described for providing a tethered selection handle for direct selection of content on a touch or gesture interface. Touch or gesture input on a computing device may be detected to begin content selection, and a start handle may be displayed near the initial input location. An end handle may be displayed to indicate an end of the selection. After the selection, the end handle, a portion of the end handle, or a separate indicator may be displayed at a location of user's current interaction point to indicate to the user that the computing device is aware of the movement of the user's interaction point away from the end handle, but the content selection had not changed. The newly displayed indicator may be tethered to the end handle to further indicate the connection between the end of the selected content and the user's current interaction point.

17 Claims, 7 Drawing Sheets

(56) References Cited

U.S. PATENT DOCUMENTS

| | | | |
|---|---|---|---|
| 2011/0239110 A1* | 9/2011 | Garrett et al. | 715/256 |
| 2011/0310026 A1* | 12/2011 | Davis et al. | 345/173 |
| 2012/0268387 A1 | 10/2012 | Kuo et al. | |
| 2012/0306772 A1* | 12/2012 | Tan et al. | 345/173 |
| 2012/0306778 A1 | 12/2012 | Weeldreyer et al. | |
| 2013/0285930 A1* | 10/2013 | Thorsander et al. | 345/173 |

OTHER PUBLICATIONS

Aimonetti, Joe, "iOS Quick Tip: Paragraph Text Selection", Retrieved at <<http://howto.cnet.com/8301-11310_39-20033608-285/ios-quick-tip-paragraph-text-selection/>>, Feb. 18, 2011, pp. 3.

"Text Fields", Retrieved at <<http://developer.android.com/design/building-blocks/text-fields.html>>, Jan. 15, 2012, pp. 2.

"International Search Report & Written Opinion Issued in PCT Patent Application No. PCT/US2013/060779", Mailed Date: Dec. 4, 2014, 11 Pages.

"Second Written Opinion Issued in PCT Patent Application No. PCT/US2013/060779", Mailed Date: Jun. 3, 2015, 7 Pages.

"International Preliminary Report on Patentability Issued in PCT Application No. PCT/US2013/060779", Mailed Date: Aug. 27, 2015, 8 Pages.

* cited by examiner

TETHERED SELECTION HANDLE

BACKGROUND

Traditional computing devices such as computers, message boards, electronic billboards, and monitoring devices are controlled directly over a user interface using input hardware. Typically, they are directly controlled using input devices such as a mouse, remote control, keyboard, or the like for controlling the device. Touch-enabled devices, however, are typically controlled over a touch interface by the detection and analysis of touch input by a user. In touch interfaces, employing touch input with a finger to select content and interact with content may be difficult and imprecise due to a limited display size of some touch-enabled devices, and a relatively large detected contact area of a finger touch.

In some examples, when a user attempts to select content displayed on a touch-enabled device, the device may detect a contact area of the finger touch input and may determine a most likely target portion of the content based on the detected contact area. Due to the smaller display size and complexity of the displayed content and nested elements, detection of finger touch input may be relatively imprecise and inaccurate, and the touch-enabled device may not accurately select the portion of content that the user intends. The user may not feel like he or she has direct control over their interactions with the touch-enabled device employing the touch input. Gesture, eye-tracking, and similar interactions mechanisms may encounter similar user experience degradations as well.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a tethered selection handle for direct selection of content on a touch or gesture based interface. A user may employ touch or gesture input on a computing device to begin content selection, and a start handle may be displayed near the initial input location. An end handle may be displayed to indicate an end point of the selection. After the selection, the end handle, a portion of the end handle, or a separate indicator may be displayed away from the end handle at a location of the user's current interaction point to indicate to the user that the computing device is aware of the movement of the user's interaction point from the end handle, but the content selection had not changed. The newly displayed indicator may be tethered to the end handle to further indicate the connection between the end of the selected content and the user's current interaction point.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
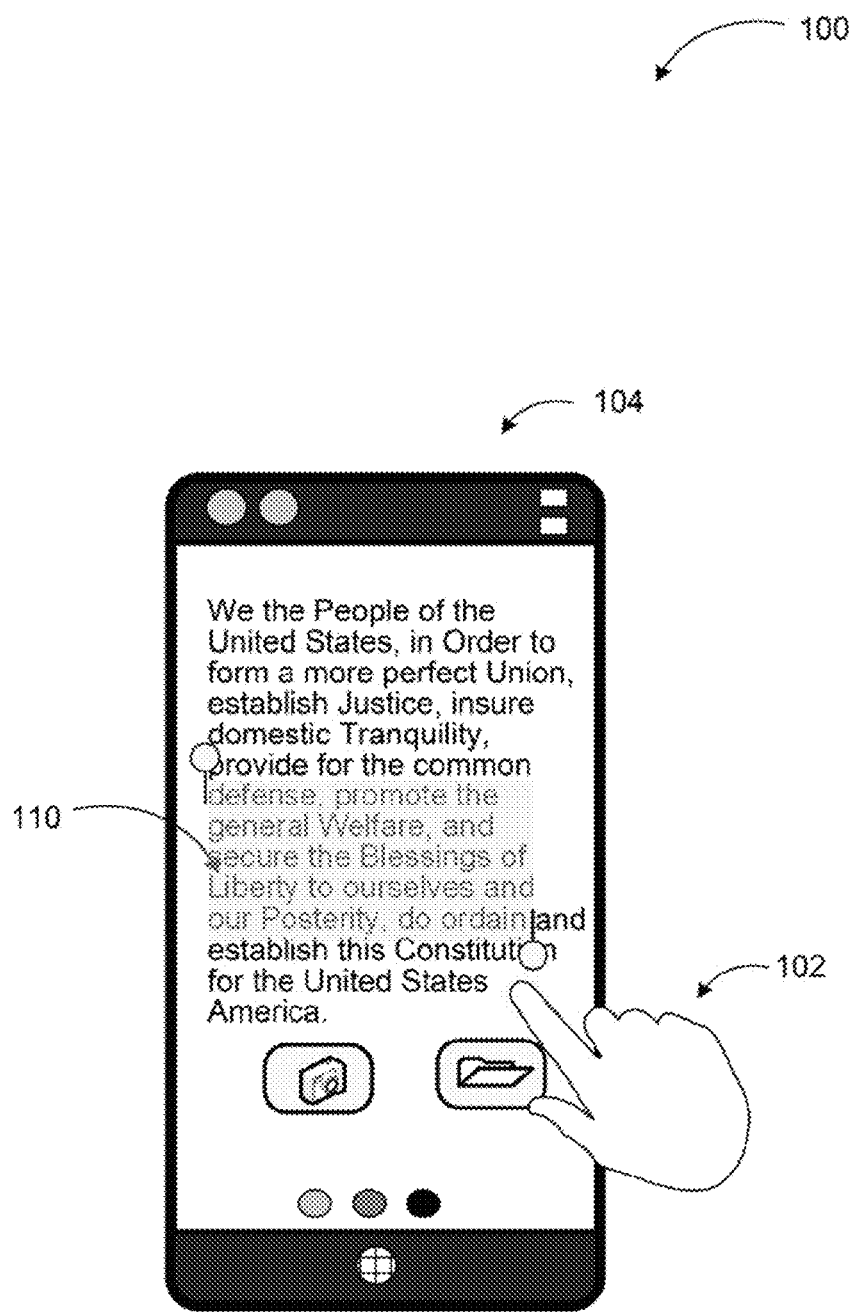
FIG. 1 illustrates an example of selection of content in a touch user interface environment.

As briefly described above, a user may employ touch or similar input to select and interact with displayed content. Upon detection of selection of a portion of content, a start handle and an end handle may be displayed to indicate the selected portion of content. Upon further detecting a movement of the user's interaction point, a new indicator may be displayed—visually tethered to the end handle—to indicate to the user that the computing device is aware of the user's current location of interaction and is awaiting further action by the user to either increase/decrease the selected content or maintain it.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in the limiting sense, and the scope of the present invention is defined by the appended claims and their equivalents. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing a tethered selection handle for selection of content. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

While touch input is used throughout the description section as an illustrative example, embodiments may be implemented using any interactive technique such as gesture, eye-tracking, input pen, and similar ones.

FIG. 1 illustrates an example of selection of content in a touch user interface environment, according to some example embodiments.

Diagram 100 illustrates an example of selection of content in a touch user interface environment. The computing device and user interface environment shown in diagram 100 are for illustration purposes. Embodiments may be implemented in various local, networked, and similar computing environments employing a variety of computing devices and systems. A touch user interface environment may be a smart phone, for example, or any touch-enabled computing device allowing a user to interact with the device through touch, such as a tablet, an e-reader, a personal digital assistant (PDA), whiteboard, or other computing device with a touch display.

In an example embodiment, an interface of a touch-enabled computing device 104, may allow a user to interact with content displayed on the user interface employing touch input 102 and gesture input, and may also work with a traditional mouse and keyboard. In some scenarios, however, input devices such as a mouse or keyboard may not be available for interacting with the touch-enabled device, and a user may be limited to providing touch input to interact with content displayed on the user interface. Example touch input may include finger touch and gesture input, as well as electronic pen or stylus input.

In a system according to embodiments, when a user views content over the user interface, the user may desire to select a portion of the content for editing, copying and pasting, saving and otherwise interacting with the selected portion 110 of content. In an example scenario, the user may employ finger touch action to select the portion of the content. The user may tap and hold on a word or other portion of content (or perform another selection initiation gesture), to begin the selection, and may drag the touch input over the portion of the content the user desires to select. While the user drags the touch input over the content, the content may become highlighted to indicate that it has been selected. Additionally, anchors or handles may appear at the beginning and end of the selected portion of the content to also indicate the selected portion 110 of the content. Other schemes for indicating content selection may also be employed such as a highlighting scheme, a color scheme, a shading scheme, and a font attribute scheme.

In an example embodiment, an interface of a touch-enabled device, such as a portable device, may have a smaller screen size, and may display content in a smaller size than on larger interfaces. A variety of types of content also may be displayed on the interface such as textual content, photos, video, and graphics and other nested elements. When a user employs a touch action to select content on the interface of the computing device, the device may be configured to anticipate content the user intends to select based on a detected location of touch input on the interface. For example, the device may detect a contact area of a finger and may determine a most likely target object of the content based on the detected contact area. Due to a larger contact area of fingers and the smaller display size and complexity of the underlying content and nested elements, detection of finger touch input may be inaccurate, and the touch-enabled device may not accurately select the portion of content that the user intends. While the user may learn and adapt to how the user's touch input manipulates the selection based on speculation of user's intent by the computing device 104, the content selection may not accurately reflect the user's intent.

Figure 2:
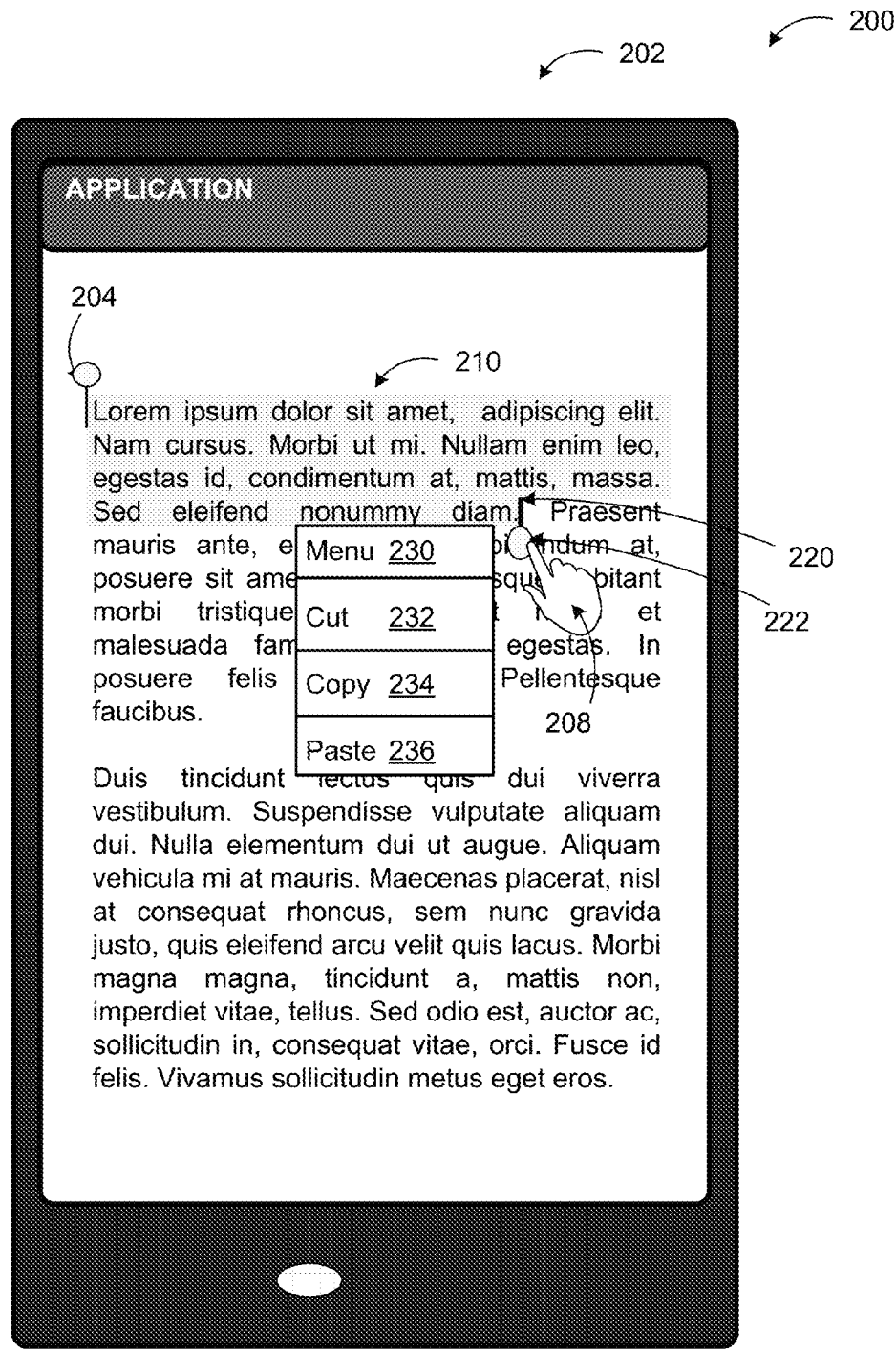
FIG. 2 illustrates an example of a tethered handle associated with selected content, according to embodiments.

FIG. 2 illustrates an example of a tethered handle associated with selected content, according to embodiments.

As illustrated in diagram 200, a user may employ touch input 208 on an interface of a touch-enabled computing device 202 to select a portion of content 210. Displayed content may include text, images, videos, and graphics, as some examples. In a system according to embodiments, the device 202 may be configured to provide a tethered selection handle associated with a content selection to reflect the user's selection intent. The tethered selection handle may also indicate that the device is aware of the user's touch interaction point on the interface.

In an example embodiment, the user may employ a finger touch input 208 to begin selecting the portion of the content 210. The user may tap and hold on a word or other portion of content (or perform another selection initiation gesture) to begin the selection, and a first handle, or a start handle 204, may appear near the initial input location to indicate initiation of the selection. Additionally, a second handle, which may be an end handle 222, may be displayed to indicate an end point of the initial selection and to provide feedback to the user as the user selects the content. The start handle 204 and the end handle 222 may be graphical representations configured to be movable to select and de-select displayed content.

In a system according to embodiments, after the user makes an initial selection of a portion of the content 210, a tether line or an indicator 220 may be displayed away from the end handle 222 at a location of the user's current interaction point on the interface. The indicator 220 may be provided to indicate to the user that the computing device is aware of the movement of the user's interaction point from the end handle 222, and to enable the user to directly control the selection of content. In an example embodiment, the indicator 220 may be the end handle 222, or a portion of the end handle 222, which may be configured to extend from the end of the selected content to the user's current interaction point. In another example embodiment, the indicator 220 may be a separate graphical indication connecting the end handle 222 to the user's current interaction point. For example, the indicator 220 may be a line, a shape or other graphic connecting the end handle to the user's current interaction point.

In a system according to embodiments, the end handle 222 may be connected to the content and tethered to the touch input 208 by the indicator 220 such that the user may directly control a location of the end handle 222 via the touch input 208. The user may drag the finger over the portion of the content the user desires to select, and the tethered end handle 222 may directly follow the user's touch input 208 to select what the user intends. While the user drags the finger over the content, the content between the start handle 204 and the end handle 222 may become highlighted to indicate the content intended for selection.

In another example scenario, the user may move the interaction point of the touch input to a new location on the interface. If there is content beneath the user's previous interaction point and the user's current interaction point, then the end handle 222 (or the indicator) may expand to the current interaction point, and the new content between the previous interaction point and the current user interaction point may become highlighted. The end handle 222 may remain displayed at the current interaction point to indicate to the user that the device is aware of the user's current location of interaction and is awaiting further action by the user to either increase or decrease the selected content or maintain it.

In a further embodiment, when the user has completed selecting intended content, the user may release the end handle 222, for example, by removing the touch input 208 from contact with the interface of the device 202. When the user releases the end handle 222, the end handle 222 may become associated with the underlying content data (snap back) to select the content and enable further interactions with the selected portion of the content 210. For example, after a release of the end handle 222, a menu 230 with further options for interacting with the selected portion of content may be displayed. An example of the menu with 230 with further options may include the menu 230 with options to cut 232, copy 234, paste 236, or otherwise edit the selected content. Furthermore, when the user has finished interacting with the selected content, the user may tap or touch elsewhere on the interface of the device 202 to remove the handles and highlights from display.

Figure 3:
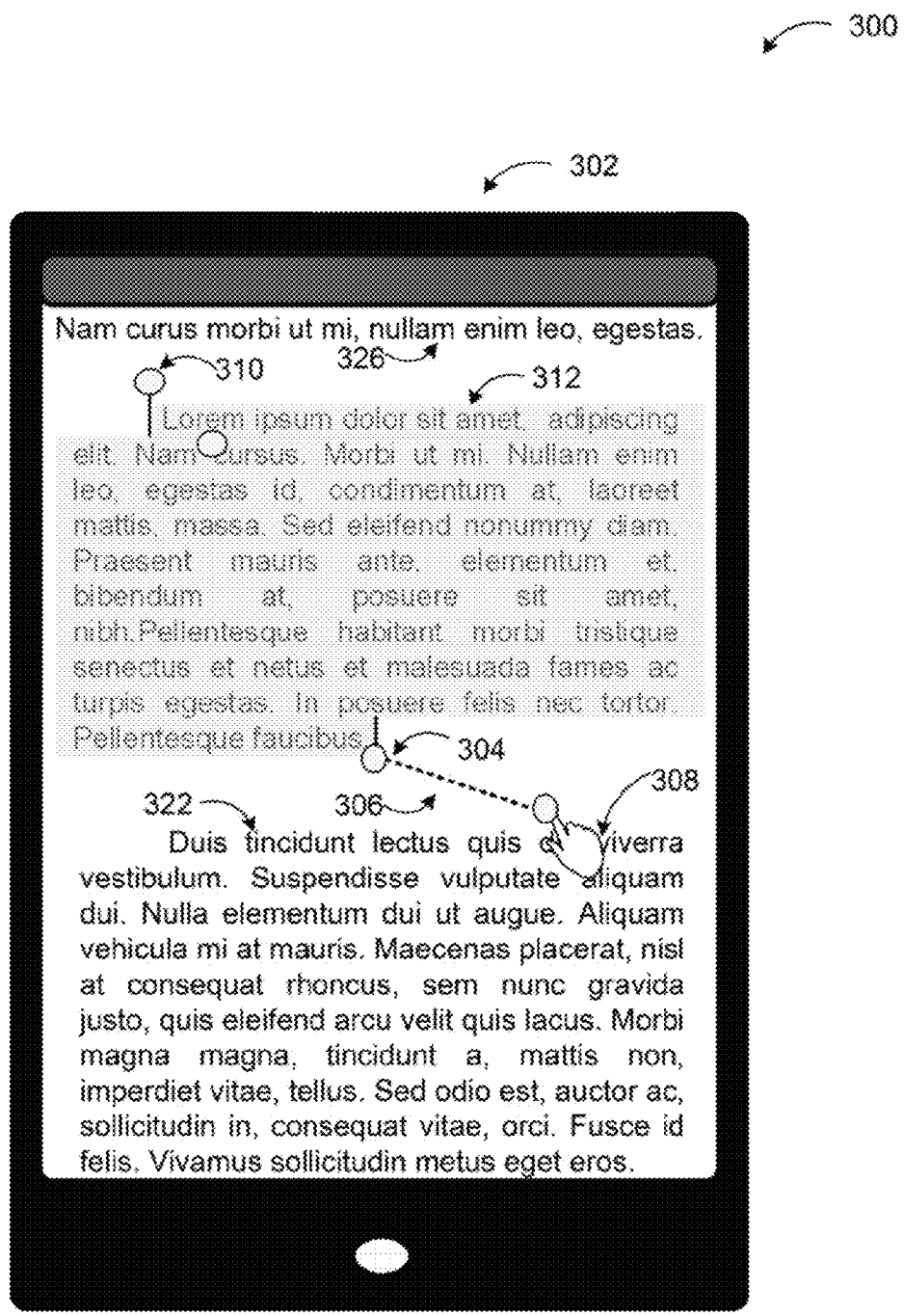
FIG. 3 illustrates an example handle tethered to touch input, according to embodiments.

FIG. 3 illustrates an example handle tethered to touch input, according to embodiments.

As illustrated in diagram 300, touch input may be employed to enable a user to select content 312 displayed on a touch-enabled computing device. An indicator associated with selected content may be displayed to provide feedback of the user's selection, and to indicate to the user that the device is aware of the user's interaction point on the device interface.

As previously described, the user may begin a selection of content 312 employing a touch input 308 by tapping and holding near a desired portion of the content and a start handle 310 may appear to indicate initiation of the selection. Additionally, an end handle 304 may be displayed at the end of a portion of selected content to provide feedback to the user as the user selects the content 312. The end handle 304 may be tethered to the touch input 308 by an indicator 306 such that the user may directly control a location of the end handle 304 employing the touch input 308.

The indicator 306 may continuously provide feedback to the user to show a relationship between the touch input 308 and the end handle 304. As the user drags the touch input 308 over content, the end handle 304 may move over the content in response to the touch input 308. The content between the start handle 310 and the end handle 304 may become highlighted to indicate that the content has been selected.

In an example embodiment, if the user drags the touch input 308 from a first interaction point over displayed content to a new interaction point, and there is no content beneath the first interaction point and the new interaction point, then the highlighted portion of content may not be expanded. The end handle 304 may expand to connect the end of the selected content with the new location of the user's touch input 308. In another embodiment, the end handle 304 may remain with the selected content, and the indicator 306 may be displayed to connect the end handle 304 with the user's current interaction point at the new interaction point away from the end handle 304. The indicator 306 may demonstrate to the user that the device 302 recognizes the location of the user's touch input at the current interaction point on the interface, but the content selection had not changed since there is no content, or empty space, between the end handle 304 and the user's current interaction point.

In a further embodiment, in the example device 302 of diagram 300, if the user desires to select additional content such as content 322, the user may move touch input down and to the right until the current interaction point is over the portion of content the user desires to select. When the current interaction point is dragged over the additional content, the end handle 304 may move to the current interaction point, and the additional content between the start handle 310 and the end handle 304 may become highlighted.

In a yet another embodiment, the user may desire to select additional content that may precede the start handle 310. The user may release the end handle 304, and may select the start handle 310, by tapping and holding on the start handle 310, for example. After selecting the start handle 310, an indicator may be provided to tether the start handle 310 to the interaction point of the touch input 308. The indicator may be the start handle 310 itself extending from the start of the selected content, or the indicator may be a separate indicator connecting the touch input to the start handle 310. The user may move the touch input over additional preceding content, and the start handle 310 may expand to the current interaction point. The preceding content between the previous interaction point and the current user interaction point may become highlighted. Additionally, the user may move one of the start handle 310 or the end handle 304 over already highlighted content to de-select the content.

In an example embodiment, the indicator 306 may be a graphical indication for demonstrating a relationship between the end handle 304 or start handle 310 and the interaction point of the touch input 308. The indicator 306 may be configured as a line or other shape in order to connect the touch input 308 to the end handle 304. Moreover, a color scheme, a graphical scheme, an animation scheme, and/or a shading scheme may be employed to enhance a visual effect of the indicator 306.

Figure 4:
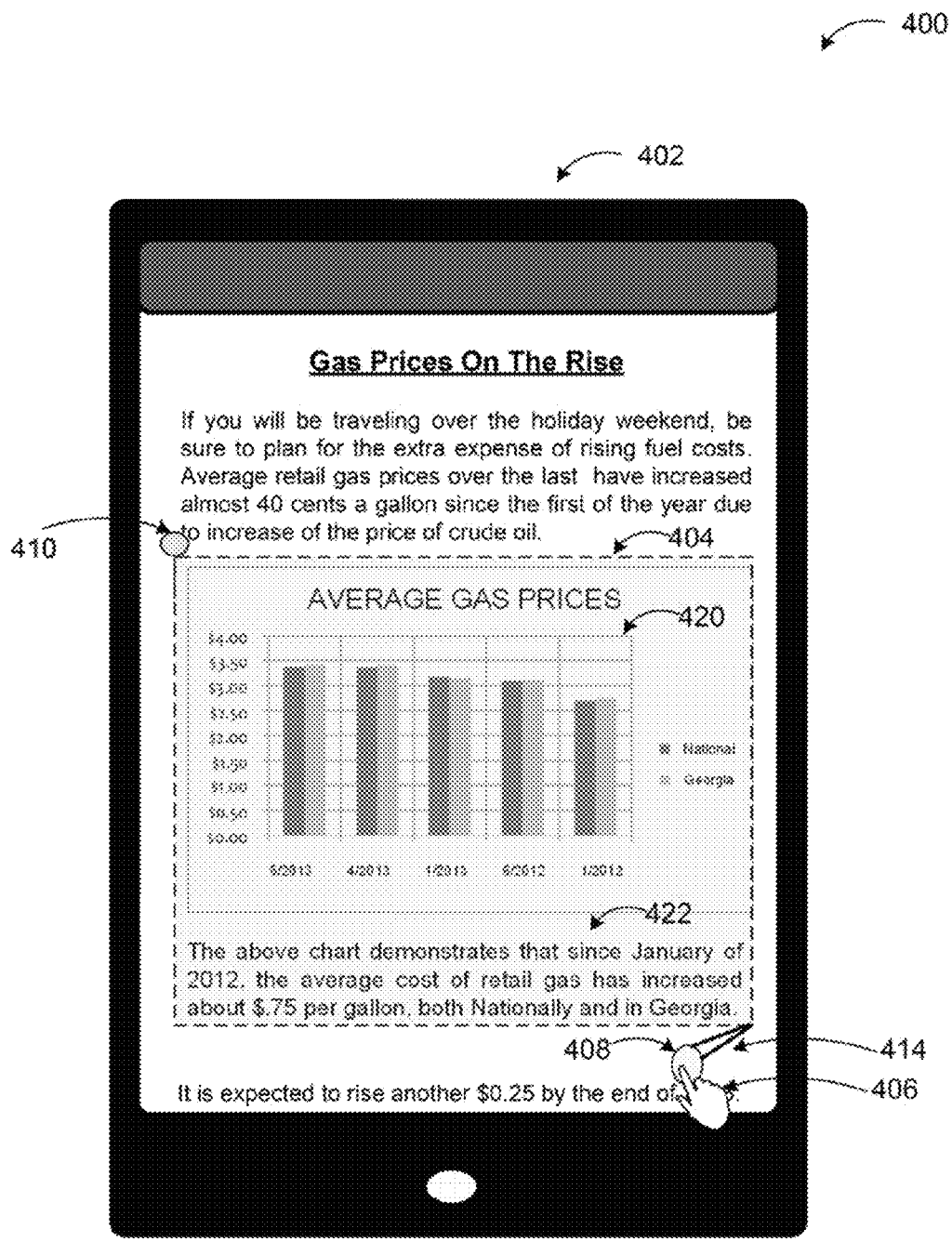
FIG. 4 illustrates example selection of graphical and textual content employing a selection handle tethered to touch input, according to embodiments.

FIG. 4 illustrates example selection of graphical and textual content employing a selection handle tethered to touch input, according to embodiments.

In a system according to embodiments, a variety of types of content may be displayed on a user interface of a touch-enabled device 402 such as text, photos, video, and graphics and other nested elements. The device 402 may be configured to enable the user to select different types of content concurrently employing touch input 406.

As illustrated in diagram 400, the user may tap and hold on a graphic 420 to begin selection, and a start handle 410 and an end handle 408 may be displayed as previously described. In an example scenario for selecting different content types concurrently, the user may move the interaction point of the touch input 406 over the graphic 420. The end handle 408 may expand to the current interaction point, and the graphic 420 may become highlighted 404. The user may also desire to select a textual caption 422 associated with the graphic 420, and the user may move the touch input over the caption 422. The textual content may be detected between the previous interaction point of the touch input and the current interaction point, and the end handle 408 may expand such that both the graphic 420 and the caption 422 located between the start handle 410 and the end handle 408 may be highlighted 404.

The example systems in FIG. 1 through 4 have been described with specific devices, applications, and interactions. Embodiments are not limited to systems according to these example configurations. A system for providing a tethered selection handle for direct selection of content on a touch interface may be implemented in configurations employing fewer or additional components and performing other tasks. Furthermore, specific protocols and/or interfaces may be implemented in a similar manner using the principles described herein.

Figure 5:
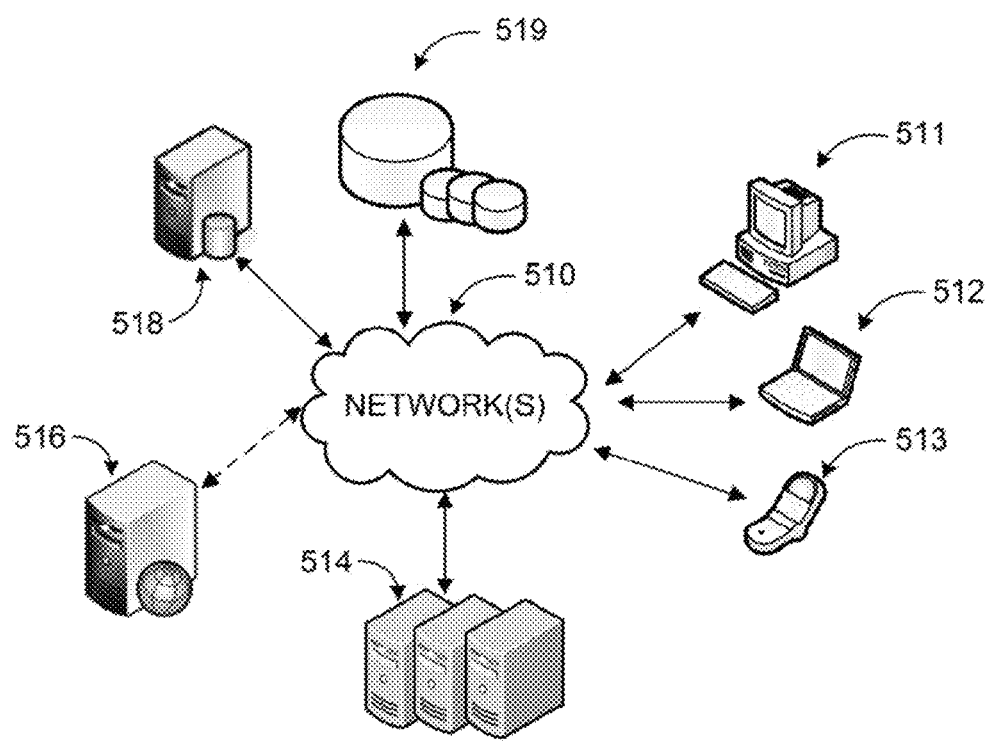
FIG. 5 is a networked environment, where a system according to embodiments may be implemented.

FIG. 5 is an example networked environment, where embodiments may be implemented. A system for providing a tethered selection handle for direct selection of content on a touch interface may be implemented via software executed over one or more servers 515 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 515, or on individual server 516. An application executed on one of the servers may facilitate the detection of a user touch input for selecting a portion of content displayed on an interface of a touch-enabled device, providing start and end handles configured to indicate the selection, and providing an indicator tethering the touch input to the handles. The application may retrieve relevant data from data store(s) 519 directly or through database server 518, and provide requested services (e.g. document editing) to the user(s) through client devices 511-513.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a platform for providing a tethered selection handle for direct selection of content on a touch interface. Furthermore, the networked environments discussed in FIG. 5 are for illustration purposes only. Embodiments are not limited to the example applications, modules, or processes.

Figure 6:
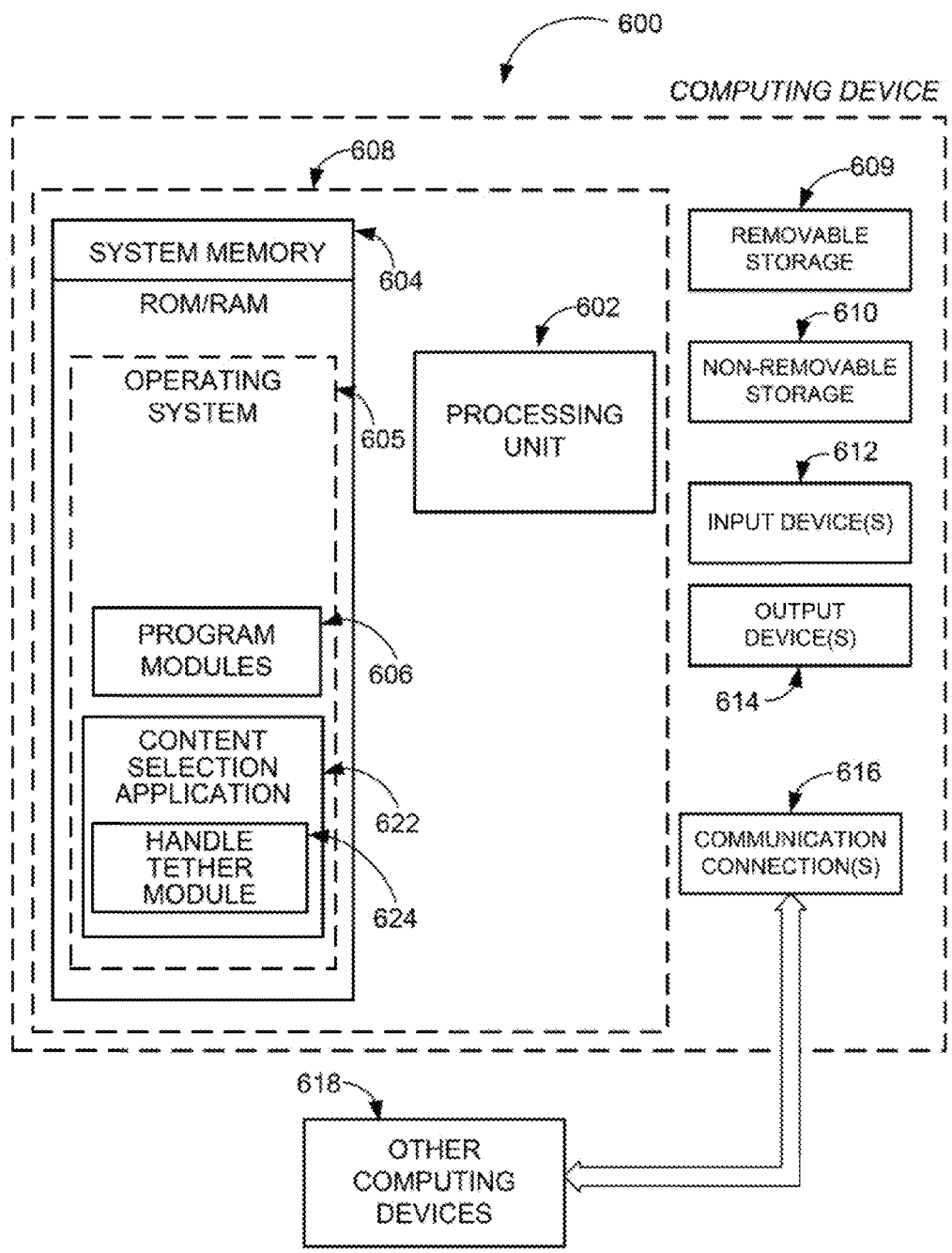
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any computing device executing an application with a touch based input mechanism for detecting user input according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 606 suitable for controlling the operation of the platform, such as the WINDOWS® operating systems from MICROSOFT CORPORATION of Redmond, Washington. The system memory 604 may also include one or more software applications such as program modules 606, content selection application 622, and handle tethering module 624.

Content selection application 622 may enable a computing device 600 to continually detect user touch input on a touch interface to detect user selection of a portion of content, and to provide start and end handles to indicate a selected portion of content. Through handle tethering module 624, content selection application 622 may provide an indicator to connect a touch input to the end handle to enable control content selection and to provide feedback of a location of the interaction point of the touch input. Content selection application 622 and handle tethering module 624 may be separate applications or integrated modules of a hosted service. Content selection application 622 may be, for example, a word processing application, a spreadsheet application, a presentation application, a note taking application, a communication (e.g., email) application, a browser, or any other application that displays content and enables a user to select parts of the displayed content. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
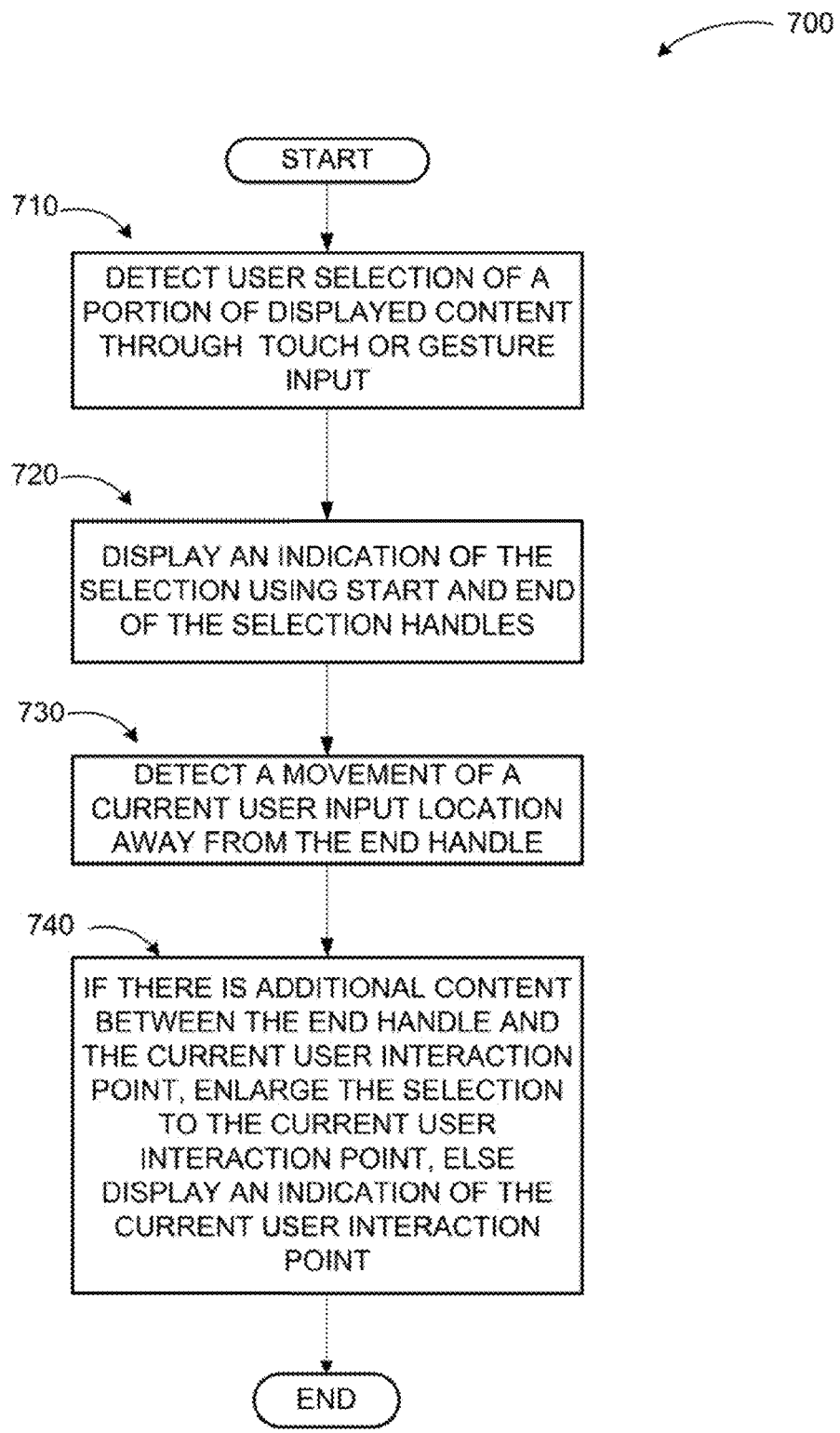
FIG. 7 illustrates a logic flow diagram for a process of providing a tethered selection handle for direct selection of content on a touch interface, according to embodiments.

FIG. 7 illustrates a logic flow diagram for a process of providing a tethered selection handle for direct selection of content on a touch interface according to embodiments. Process 700 may be implemented on a computing device or similar electronic device capable of executing instructions through a processor.

Process 700 begins with operation 710, where a user selection of a portion of content displayed on a computing device through one of touch and gesture input may be detected. At operation 720, an indication of the selection may be provided where the indication may include a first handle and a second handle to indicate a start of the selection and an end of the selection. At operation 730, the device may detect a movement of the touch input away from second handle to a current interaction point on the interface of the device. At operation 740, if there is additional content between the second handle and the current interaction point, then the selected content may be enlarged to select the additional content between the current position and the new position. If there is no content between the current position of the touch input of the previous position of the second handle, then an indication of the current interaction point may be displayed by providing an indicator connecting the selected portion of content to the touch input.

The operations included in process 700 are for illustration purposes. User touch input detection and providing a tethered selection handle for direct selection of content on a touch interface may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method for providing a tethered selection handle in conjunction with selection of content, the method comprising:
   detecting a selection of a portion of content displayed on an interface of a computing device through one of: a touch input or a gesture input;
   displaying an indication of the selection employing a first handle and a second handle, wherein the first handle indicates a start of the selection and the second handle indicates an end of the selection, and wherein the indication provides a feedback to show a relationship between the selection and the second handle;
   in response to a first movement of a current user interaction point over a preceding content, expanding the selection to include the preceding content and moving the first handle to a start of the selection;
   detecting a second movement of the current user interaction point away from the second handle;
   if there is additional content between the current user interaction point and the second handle, expanding the selection to include the additional content between the current user interaction point and the second handle; else
   displaying an indication of the current user interaction point with a visual connection to the second handle, wherein the visual connection indicates a preservation of the selection at the current user interaction point; and
   displaying a menu with one or more options to interact with the selection in response to a release of the second handle, wherein the one or more options are configured to edit the selection.

2. The method of claim 1, wherein displaying the indication of the selection further includes employing one or more of: a highlighting scheme, a color scheme, a shading scheme, and a font attribute scheme.

3. The method of claim 1, wherein displaying the indication of the selection employing the first handle and the second handle further includes displaying a combination of two graphics, one of which is movable to indicate the current user interaction point.

4. The method of claim 1, wherein displaying an indication of the current user interaction point further includes displaying a new graphic indication of the current user interaction point, wherein the new graphic indication connects the selection to the current user interaction point.

5. The method of claim 4, wherein displaying the new graphic indication further includes employing one of: a line, a shape and a graphic to connect the selection to the current user interaction point.

6. The method of claim 5, wherein displaying the new graphic indication further includes employing one or more of a: color scheme, a graphical scheme, an animation scheme, and/or a shading scheme.

7. The method of claim 1, wherein displaying the indication of the current user interaction point includes moving a portion of the second handle to the current user interaction point, wherein the moved portion of the second handle is visually connected to another portion of the second handle indicating the end of the selection.

8. The method of claim 1, further comprising:
   detecting a touch action on another portion of the interface; and
   removing the indication of the selection.

9. A computing device with one or more of a touch-enabled and gesture-enabled input, the computing device comprising:

a user interface component; and a control component configured to:
- detect a user selection of a portion of content displayed on the user interface component through one of: a touch input or a gesture input;
- display an indication of the selection employing a first handle and a second handle, wherein the first handle indicates a start of the selection and the second handle indicates an end of the selection, and wherein the indication provides a feedback to show a relationship between the user selection and the second handle;
- in response to a first movement of a current user interaction point over a preceding content, expand the selection to include the preceding content and move the first handle to a start of the selection;
- detect a second movement of the current user interaction point away from the second handle;
- if there is additional content between the current user interaction point and the second handle, expand the selection to include the additional content between the current user interaction point and the second handle; else,
- display an indication of the current user interaction point with a visual connection to the second handle, wherein the visual connection indicates a preservation of the selection at the current user interaction point; and
- display a menu with one or more options to interact with the selection in response to a release of the second handle, wherein the one or more options are configured to edit the selection.

10. The computing device of claim 9, wherein the user selection is a gesture initiating a selection on the portion of content.

11. The computing device of claim 9, wherein the first handle and the second handle include a combination of two graphics, one of which is movable to indicate the current user interaction point.

12. The computing device of claim 11, wherein at least one of the first handle and the second handle is a graphic configured to be movable in order to perform one of: enlarge or reduce the selected portion of the content.

13. The computing device of claim 9, wherein control component is further configured to:
- display a new graphic indication of the current user interaction point, wherein the new graphic indication is one of a portion of the second handle visually connected to another portion of the second handle at the end of the selection and a distinct indicator visually connected to the second handle.

14. The computing device of claim 13, wherein the visual connection is one of a line, a shape, and a graphic enhanced by one or more of: a color scheme, a graphical scheme, an animation scheme, and a shading scheme.

15. The computing device of claim 9, wherein the indication of the selection includes one of: a highlighting scheme, a color scheme, a shading scheme, and a font attribute scheme.

16. A method to provide a tethered selection handle for direct selection of content on a touch interface, the method comprising:
- detecting a user selection of a portion of content displayed on an interface of a computing device through one of: a touch input or a gesture input;
- displaying an indication of the selection employing a first handle and a second handle, wherein the first handle indicates a start of the selection and the second handle indicates an end of the selection, and wherein the indication provides a feedback to show a relationship between the selection and the second handle;
- in response to a first movement of a current user interaction point over a preceding content, expanding the selection to include the preceding content and moving the first handle to a start of the selection;
- detecting a second movement of the current user interaction point away from the second handle;
- if there is additional content between the current user interaction point and the second handle, expanding the selection to include the additional content between the current user interaction point and the second handle; else,
- displaying an indication of the current user interaction point with a visual connection to the second handle, wherein the visual connection indicates a preservation of the selection at the current user interaction point; and
- displaying a menu with one or more options to interact with the selection in response to a release of the second handle, wherein the one or more options are configured to edit the selection.

17. The method of claim 16, further comprising:
- displaying a new graphic indication of the current user interaction point, wherein the new graphic indication is one of a line, a shape, and a graphic, configured to connect the selection to the current user interaction point.

* * * * *